(12) United States Patent
Keil et al.

(10) Patent No.: US 10,911,890 B2
(45) Date of Patent: *Feb. 2, 2021

(54) AUTO-RESIZING OF GEOFENCES

(71) Applicant: Life360, Inc., San Francisco, CA (US)

(72) Inventors: Dylan Keil, Menlo Park, CA (US); Alexander Haro, San Francisco, CA (US)

(73) Assignee: Life360, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/809,417

(22) Filed: Mar. 4, 2020

(65) Prior Publication Data

US 2020/0204948 A1 Jun. 25, 2020

Related U.S. Application Data

(63) Continuation of application No. 16/002,379, filed on Jun. 7, 2018, now Pat. No. 10,623,893.

(60) Provisional application No. 62/634,113, filed on Feb. 22, 2018.

(51) Int. Cl.
| | |
|---|---|
| *H04W 4/021* | (2018.01) |
| *H04W 4/029* | (2018.01) |
| *H04W 4/08* | (2009.01) |
| *H04W 68/04* | (2009.01) |
| *H04L 29/08* | (2006.01) |

(52) U.S. Cl.
CPC ............ *H04W 4/022* (2013.01); *H04L 67/22* (2013.01); *H04W 4/029* (2018.02); *H04W 68/04* (2013.01)

(58) Field of Classification Search
CPC ..... H04W 4/022; H04W 68/04; H04W 4/029; H04W 4/08; H04W 4/021; H04L 67/22; H04L 67/1059
USPC ........................................................ 455/456.1
See application file for complete search history.

(56) References Cited

U.S. PATENT DOCUMENTS

| | | | |
|---|---|---|---|
| 9,338,598 | B2 | 5/2016 | Hakanson |
| 9,344,552 | B2 | 5/2016 | Leemet et al. |
| 9,485,620 | B2 | 11/2016 | Henson et al. |
| 9,788,163 | B2 | 10/2017 | Haro et al. |
| 10,187,745 | B1 | 1/2019 | Zhao |

(Continued)

FOREIGN PATENT DOCUMENTS

WO    WO-2015/116673    8/2015

*Primary Examiner* — Inder P Mehra
(74) *Attorney, Agent, or Firm* — Womble Bond Dickinson (US) LLP

(57) ABSTRACT

In one embodiment, POI information is received from a first mobile communication device (MCD) of a group of communication devices respectively associated with group members. The POI information includes an identified location to establish a geofence to track activities of the group members at a POI. The geofence surrounding the POI is established based on the POI information. Whether there are changes to the activities of the group of communication devices are determined, where the changes to the activities include a geofence crossing by a group member. A notification is sent to each of the group of communication devices in response to determining that the geofence crossing by the group member has occurred. The geofence crossing indicates an arrival or departure of the group member at the POI. The geofence is resized based on the changes to the activities.

16 Claims, 15 Drawing Sheets

(56) References Cited

U.S. PATENT DOCUMENTS

| | | | |
|---|---|---|---|
| 2014/0164118 A1* | 6/2014 | Polachi | G06Q 30/0259 |
| | | | 705/14.57 |
| 2015/0018019 A1 | 1/2015 | Haro et al. | |
| 2015/0140989 A1 | 5/2015 | Leemet et al. | |
| 2015/0237475 A1 | 8/2015 | Henson et al. | |
| 2016/0014559 A1 | 1/2016 | Hakanson | |
| 2016/0125519 A1* | 5/2016 | Sundaresan | G06Q 30/08 |
| | | | 705/26.3 |
| 2016/0169696 A1* | 6/2016 | Butts, III | G01C 21/3461 |
| | | | 701/438 |
| 2016/0227376 A1 | 8/2016 | Hernoud et al. | |
| 2016/0286349 A1* | 9/2016 | Borghei | H04W 4/023 |
| 2016/0316329 A1 | 10/2016 | Frenz et al. | |
| 2017/0293848 A1* | 10/2017 | Sorden | H04W 4/025 |
| 2017/0303082 A1 | 10/2017 | Jones | |
| 2018/0293617 A1* | 10/2018 | Pittman | G06Q 30/0264 |
| 2018/0316571 A1* | 11/2018 | Andrade | G06Q 10/06398 |
| 2019/0228435 A1 | 7/2019 | Deluca et al. | |

* cited by examiner

AUTO-RESIZING OF GEOFENCES

CROSS REFERENCE TO RELATED APPLICATIONS

This application is a continuation of U.S. patent application Ser. No. 16/002,379 filed on Jun. 7, 2018, which claims the benefit of U.S. Provisional Application No. 62/634,113 filed on Feb. 22, 2018, the disclosures of which are incorporated herein by reference.

FIELD OF THE INVENTION

Embodiments of the present disclosure relate generally to enhancement of family/group interactions. More particularly, embodiments of the disclosure relate to a geofence in a mapped area as a virtual boundary created using location sensing technology on mobile devices.

BACKGROUND

A geofence in a mapped area is a virtual boundary created using location sensing technology on mobile devices (e.g., smartphones, tablets, laptops, wearable computers, etc.). The geofence is generated as a virtual predefined set of geographical boundaries. When a registered location-aware mobile device crosses a geofence, a notification is generated. The notification is sent to a registration server and to any pre-arranged or pre-registered mobile device or email account.

Identifying the location of a mobile device accurately has become a necessity in many applications such as geo-fencing, geo-location, mobile tracking, personal identification, etc. For example, global positioning systems (GPS) using satellites and cell towers (e.g., triangulation method) for location fixing of mobile communication devices (MCDs), such as cell phones, tablets (e.g., iPad®) and the like, have become more common with the widespread use of mobile communication devices and wireless connectivity. While location (or position) fixing capability has improved over the past years, there are still improvements to be made. For instance, current location fixing methods generally use a geo-positioning satellite or triangulation using local wireless towers and available sensors to identify and fix the location of a MCD. The positioning accuracy of such location fixing methods, however, is inadequate due to the inaccuracies of the sensors and/or reflections from the MCD's surroundings (e.g., neighboring geographical and manmade structures). Such inaccuracies and reflections generally cause an identified location to bounce around in a very haphazard way, and the location error introduced by them can be within a range of up to three miles, thereby making any geofences deployed very erratic in controlling access to locations. The large error boundary of the location also creates false alerts when geofences are implemented, which limit the effectiveness of the geofences.

As an example, referring to FIG. 1, which is a diagram illustrating a conventional location sensing (or fixing) system. As shown, location sensing system 100 may include an MCD 101, wireless or cell towers 102-1 and 102-2, a WiFi base station 103, GPS satellites 105-1 and 105-2, and a tracking and monitoring server (TMS) 107 coupled or connected to a display device (e.g., a computer monitor, television, and the like) having display screen 108.

As further shown in FIG. 1, GPS satellites 105-1 and 105-2 are used to generate a location fix for MCD 101. Wireless towers 102-1 and 102-2 or WiFi base station 103 are also used to fix the location of MCD 101, for example, by triangulation. This location information is transmitted over network 106 (e.g., a cloud service) to TMS 107 where it is displayed at the display screen 108. TMS 107 also ensures that the location information is provided to MCD 101 for display on a display device of MCD 101, and saved as historical information in a data store (e.g., a database).

FIG. 2 is a diagram illustrating a display device that displays a map using a conventional location fixing method. Referring to FIG. 2, a display device 200 includes display screen 108 that presents or displays a representation of a map 250 including location 210 of MCD 101, major roads 201, minor roads 202, and locations of buildings 203 and 204. As previously described, the accuracy of location 210 can be dependent on the sensitivity of the sensors (e.g., GPS, gyroscope, accelerometer, compass, barometer, etc.) used to fix location 210, and the error boundary of location 210. The possible error in this prior art scenario is indicated by error radius 212. Therefore, the actual location of MCD 101 can be anywhere within the limit of error radius 212, which defines error boundary 211. That means, for example, that even when the MCD 101 is actually within the building 203, the location of the MCD 101 (e.g., location 210) may indicate that MCD 101 is located outside of building 203. Such position error has been found to be as much as one (1) to three (3) miles when using such conventional method of location fixing.

Referring to FIG. 3, which is a diagram illustrating a display screen displaying a conventional geofence, display screen 108 may display geofence 301 defined or setup by sensors of MCD 101 (e.g., GPS, gyroscope, accelerometer, compass, barometer, etc.) using historical information saved in a data store (not shown) that is coupled to or installed on TMS 107. In the example shown in FIG. 3, geofence 301 is defined to encompass building 203. Accordingly, when a user of MCD 101 enters or exits geofence 301, for example to access roads 201-202 around building 203, an alert (e.g., a notification, email, text message, and the like) may be generated and sent to MCD 101 and/or another MCD, for example by TMS 107. Such geofence 301, for example, can be utilized in a child protection scheme to prevent a child from accessing roads 201-202 unsupervised for safety of the child. However, if an MCD associated with the child has a large error boundary, the child's safety may be compromised. For example, in FIG. 3, a first child's MCD may have a location 210-1 and a second child's MCD may have a location 210-2. Locations 210-1 and 210-2 may respectively have error boundaries 211-1 and 211-2, which are defined by radii 212-1 and 212-2 respectively.

In this example, the first child represented by location 210-1, which is outside of geofence 301, and the second child represented by location 210-2, which is within geofence 301, would both be in danger since overlapping regions 302 formed by error boundary 211-1 and geofence 301, and overlapping region 303 formed by error boundary 211-2 and geofence 301 may indicate that both children are within geofence 301, thereby being within a safe region. However, in actuality the children can be outside of geofence 301. The responses in both of these cases therefore would be undesirable (i.e., a false positive alert). Furthermore, the sensitivity range and bounce range of a tracked MCD (e.g., MCD 101) would make establishment of an accurate geofence difficult as the error boundary is not always fixed. As described above, such would cause false alerts to be registered and real or true alerts to be ignored or unregistered, thereby causing critical geofence applications to be ineffective except for very loosely controlled applications.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
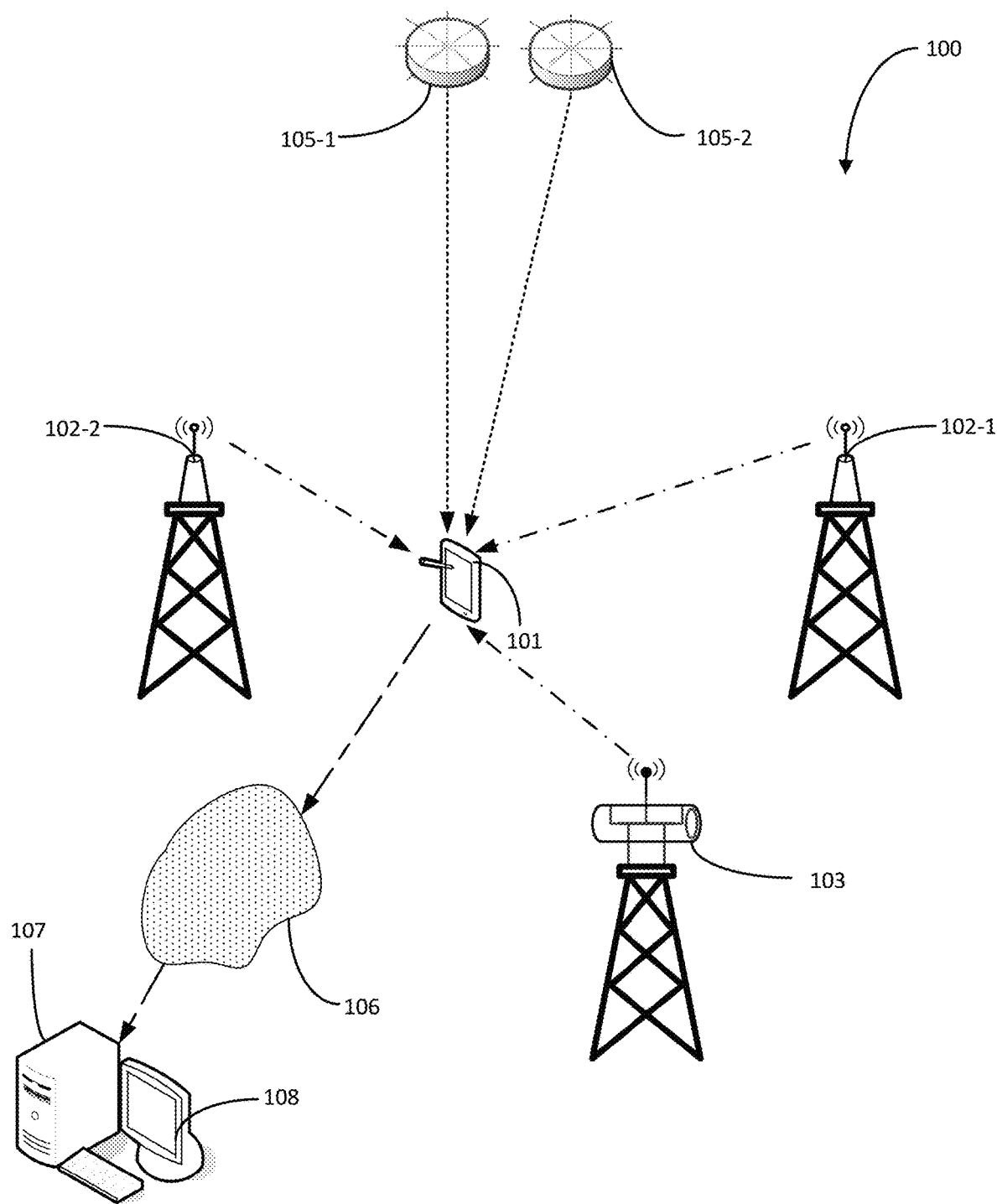
FIG. 1 is a diagram illustrating a conventional location sensing (or fixing) system.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment", "an embodiment", or "some embodiments" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, POI information is received from a first mobile communication device (MCD) of a group of communication devices respectively associated with group members. The POI information includes an identified location to establish a geofence to track activities of the group members at a POI. The geofence surrounding the POI is established based on the POI information. Whether there are changes to the activities of the group of communication devices are determined, where the changes to the activities include a geofence crossing by a group member. A notification is sent to one assigned communication device of a member or as many as to each of the group of communication devices in the group in response to determining that the geofence crossing by the group member has occurred. The geofence crossing indicates an arrival or departure of the group member at the POI. The geofence is resized based on the changes to the activities.

In one embodiment, to determine whether there are changes to the activities, one or more specific regions within the POI are identified based on historical visiting patterns of the group of communication devices visiting the specific regions. In one embodiment, to resize the geofence, the geofence is automatically resized to encompass the identified specific regions.

In one embodiment, for each of the specific regions within the POI, a visiting frequency, a visiting recency, or a dwell time of the group of communication devices visiting the specific region is determined based on the historical visiting patterns of the group of communication devices. The visiting frequency, the visiting recency, or the dwell time of each MCD visiting the specific region is represented in a data representation. In one embodiment, to resize the geofence, the geofence is automatically adjusted in accordance with the data representation.

In one embodiment, for each of the specific regions within the POI, a visiting frequency, a visiting recency, or a dwell time of the group of communication devices visiting a sub-region within the specific region is determined based on the historical visiting patterns of the group of communication devices. A data representation representing the visiting frequency, visiting recency, or dwell time of each MCD visiting the sub-region is generated. In one embodiment, to resize the geofence, the geofence is automatically adjusted in accordance with the data representation.

The capability for accurate location fixing introduced in embodiments of the present disclosure, using the subject matter disclosed in the U.S. Pat. No. 9,788,163 ('163 patent), entitled "Apparatus and method for increasing accuracy of location determination of mobile devices within a location-based group," the disclosure of which is incorporated herein by reference, improves the accuracy of location fixing, and provides the capability to reduce the error bounds to reasonably small distances. The improved location fixing capability enable more accurate and effective geofences to be instantiated and allow geofences to be adjusted, not based on the large error bounds of the MCDs for more accurate tracking of MCDs as they cross geofence boundaries, thereby reducing false notifications.

Figure 4A:
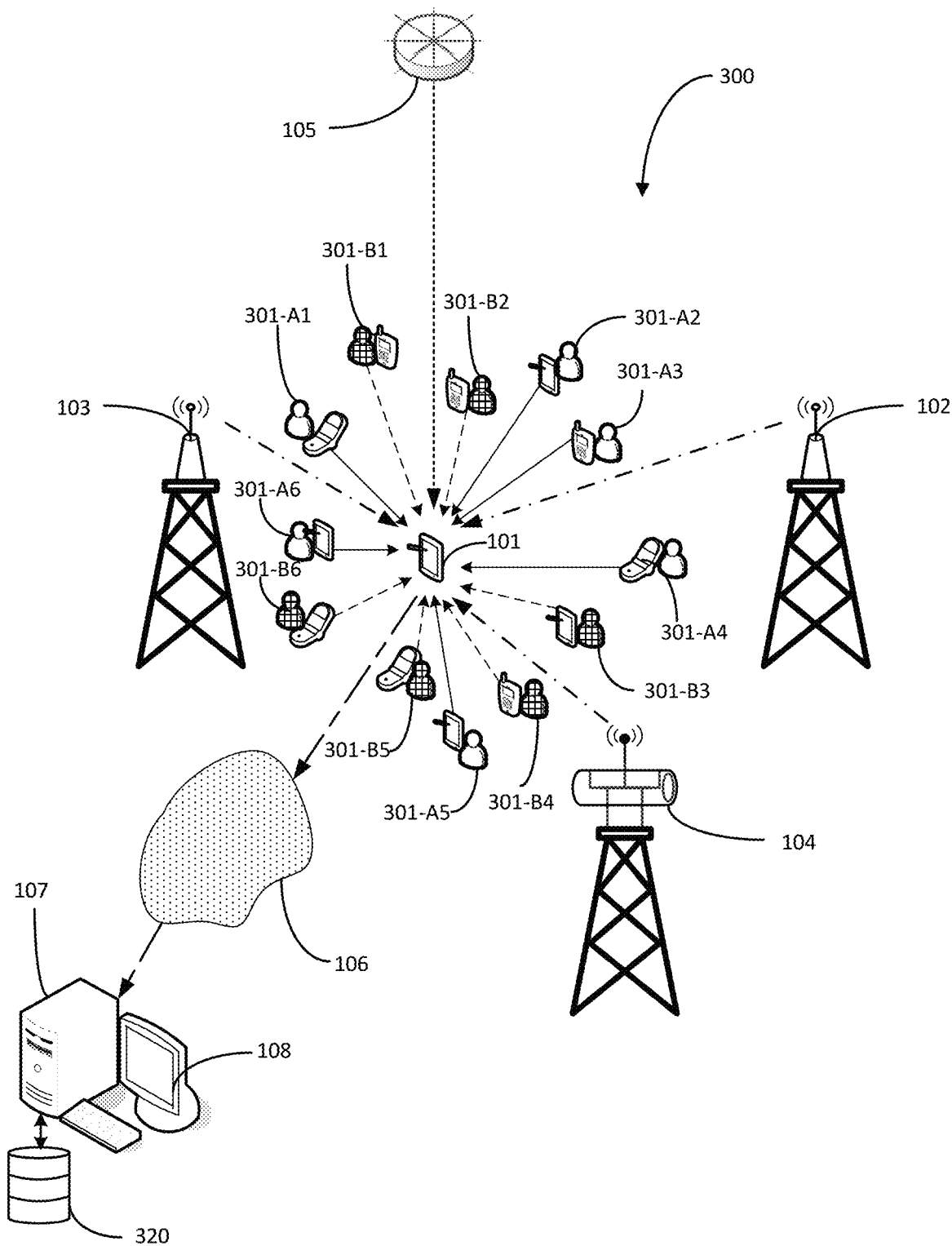
FIG. 4A is a diagram illustrating an improved location sensing (or fixing) system.

FIG. 4A is a diagram illustrating the improved location sensing (or fixing) system. In FIG. 4A, location sensing system 300 may be the system for increasing accuracy of a location determination of mobile devices within a location-based subgroup, as disclosed by the '163 patent. Referring to FIG. 4A, location sensing system 300 may include GPS satellite 105, wireless or cell towers 102-103, and/or WiFi base station 104 for triangulation for initial fixing of MCD 101's location. MCD 101, for example, may be a portable computer, such as laptop, notebook, tablet, and handheld computers, or may also take the form of other types of devices, such as a mobile telephone, media player, personal data organizer, handheld game platform, cameras, and/or a combination of such devices. This location is then refined by inputs and sensitivity limits provided by other available MCDs 301-A1 to 301-A6 and 301-B1 to 301-B6 that are in the proximity of the MCD 101 and can provide overlapping location boundaries that determine a final location of MCD 101, as shown in FIG. 4A. With continued reference to FIG. 4A, each of MCDs 301-A1 to 301-A6 may be a member of a registered group of MCDs that includes MCD 101 and is registered with a tracking server 107. Each of MCDs 301-B1 to 301-B6 may be a member of a registered group of MCDs that does not include MCD 101 and is also registered with tracking server 107. Server 107 may link with MCDs 101, 301-A1 to 301-A6, and 301-B1 to 301-B6 over network 106 (e.g., Internet, cloud network) to communicate with the MCDs. For example, server 107 may track the locations of MCDs 101, 301-A1 to 301-A6 and MCDs 301-B1 to 301-B6, and collect and transfer location data and proximity information of the MCDs. The location data and proximity information of the MCDs may be stored in data store 320 (e.g., a database).

Figure 4B:
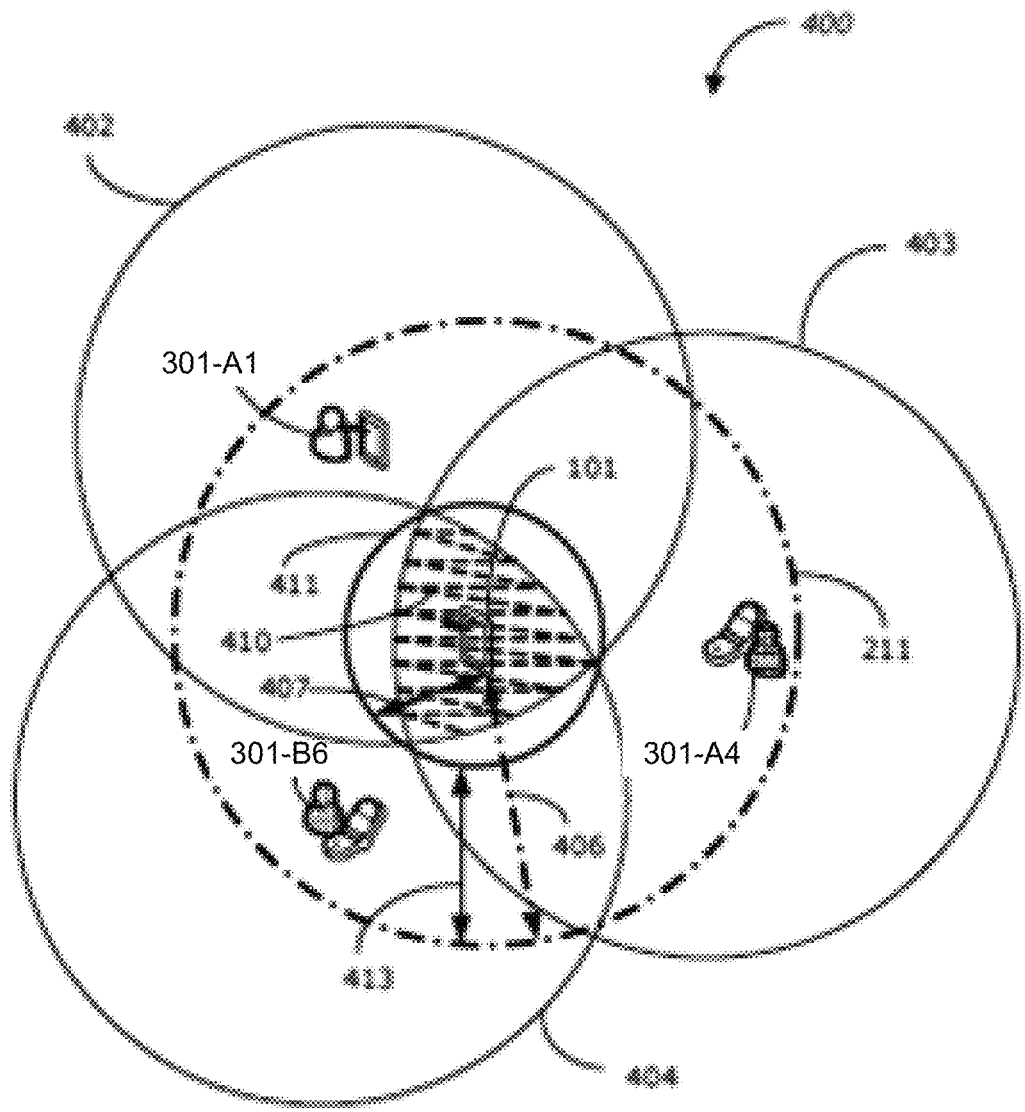
FIG. 4B is a diagram illustrating an example of the improved location sensing system.

FIG. 4B is a diagram illustrating an example of the improved location sensing system 300. In FIG. 4B, location sensing system 400 may include MCDs 301-A1, 301-A4 and 301-B6 that respectively generate location boundaries (or sensor accuracy limits) 402, 403 and 404 to form intersection (or overlapping region) 410 that is utilized to refine, tune or adjust the location of the MCD 101, which may be located within overlapping region 410. The adjustment, for example, would reduce error boundary 211 of MCD 101 from having radius 406 to having a significantly smaller radius 407 (e.g., 1 meter or less), thereby placing the location of MCD 101 within an improved and smaller error boundary 411. The difference or delta between radius 406 and radius 407 is indicated by radius 413.

Figure 5A:
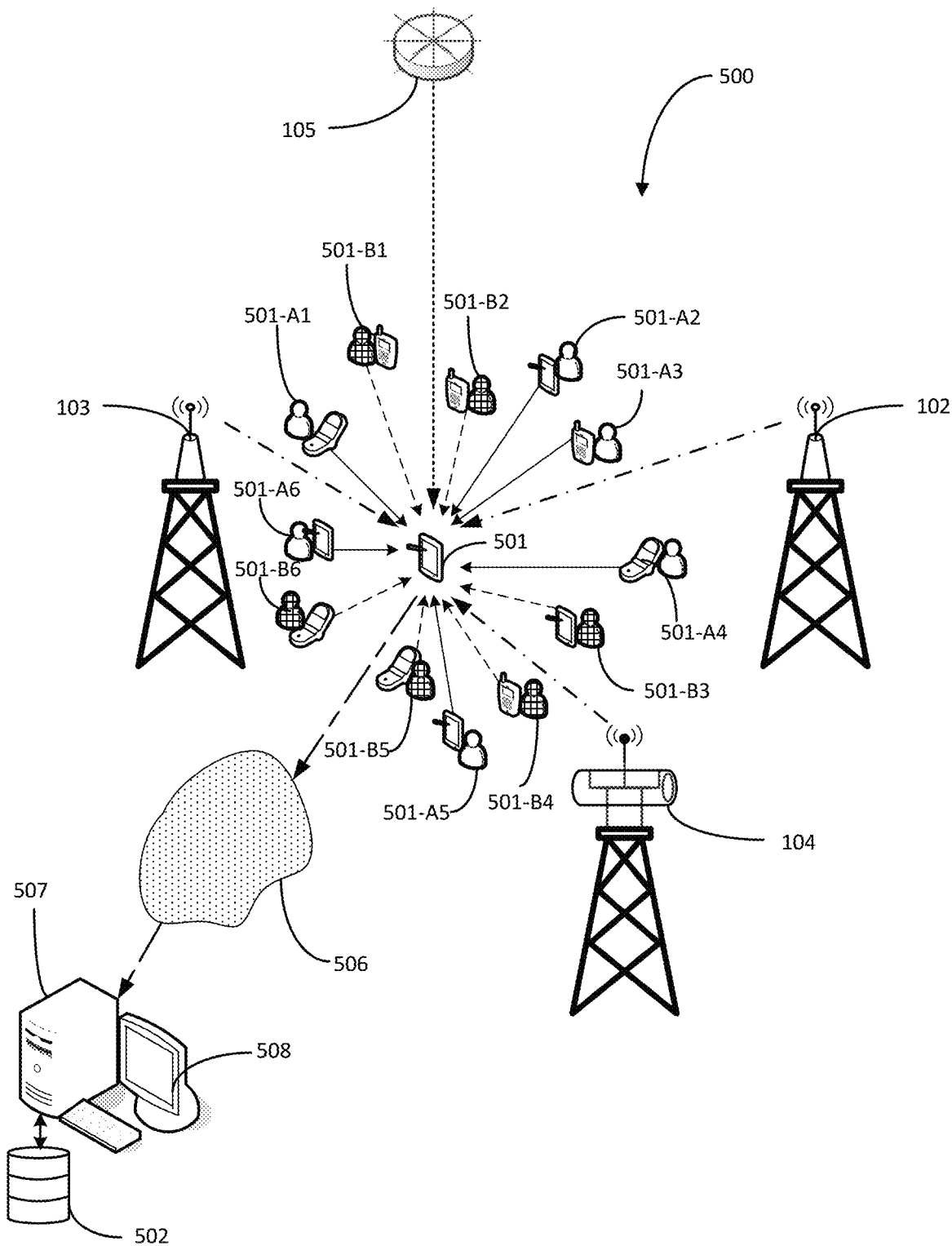
FIG. 5A is a diagram illustrating a location sensing (or fixing) system according to one embodiment.

FIG. 5A is a diagram illustrating a location sensing (or fixing) system according to one embodiment. In some embodiments, location sensing system 500 may include aspects of location sensing system 300 of FIG. 4A. Therefore, location sensing system 500 may include aspects of the system for increasing accuracy of a location determination of mobile devices within a location-based subgroup, as disclosed by the '163 patent. In some embodiments, the various components of system 500 (e.g., GPS satellite 105, wireless or cell towers 102-103, WiFi base station 104, MCDs 501, 501-A1 to 501-A6, 501-B1 to 501-B6, network 506, server 507, display screen 508, and data store 502) may be similar to the components of system 300 described above with respect to FIG. 4A, and for brevity sake, are not described again. In some embodiments, network 506 may be any type of networks such as a local area network (LAN), a wide area network (WAN) such as the Internet, a cellular network, a satellite network, or a combination thereof, wired or wireless. In some embodiments, server 507 may be any kind of servers or a cluster of servers, such as Web or cloud servers, application servers, backend servers, or a combination thereof. Servers 507 may be data analytics servers, content servers, traffic information servers, map and point of interest (MPOI) severs, or location servers, etc. It should be appreciated that while system 500 of FIG. 5A illustrates MCDs 501, 501-A1 to 501-A6, 501-B1 to 501-B6, GPS satellite 105, wireless or cell towers 102-103, and WiFi base station 104, any number of GPS satellites, cell towers, base stations, and MCDs may exist in system 500.

Figure 2:
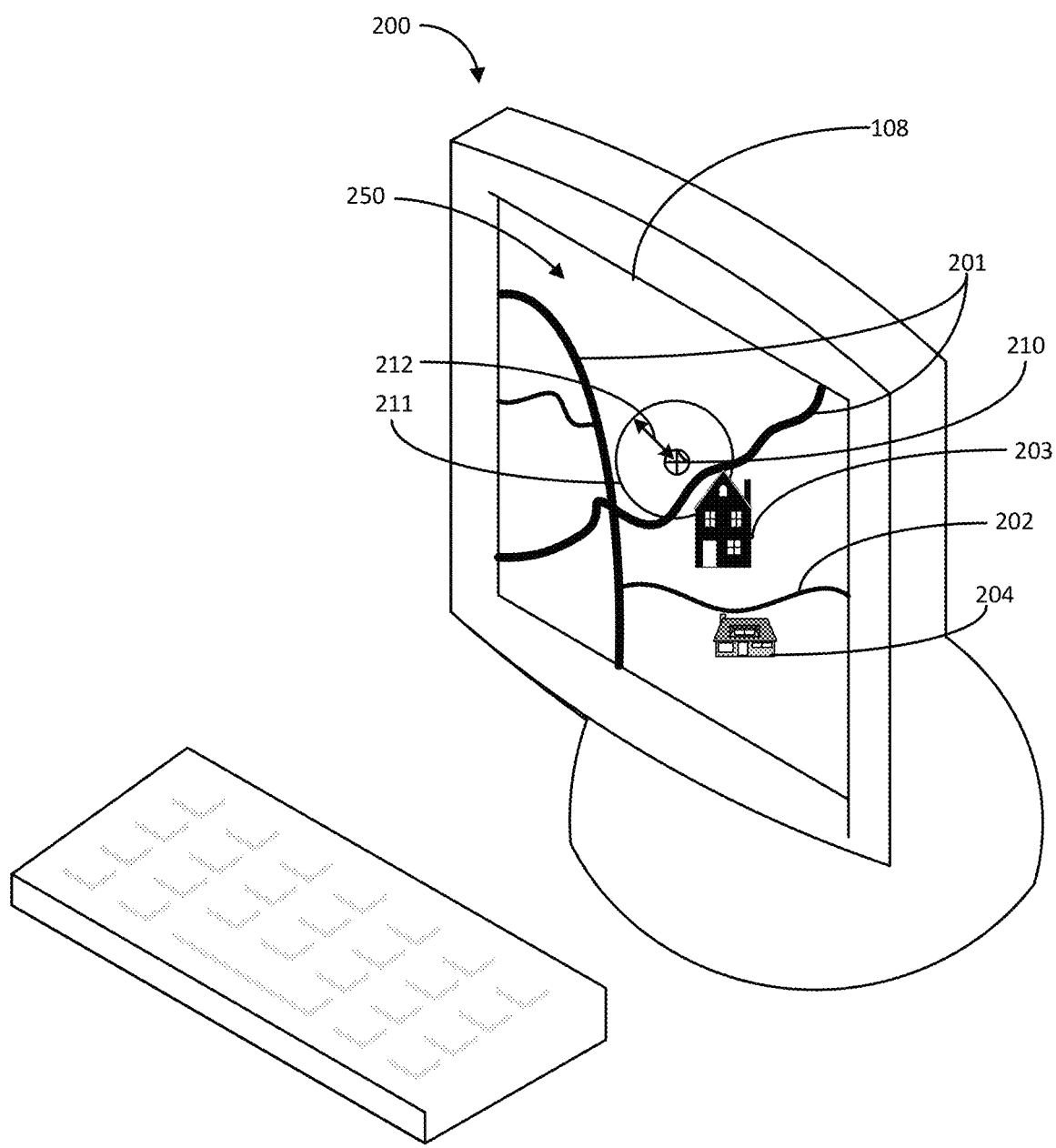
FIG. 2 is a diagram illustrating a display device that displays a representation of a map using a conventional location fixing method.
Figure 3:
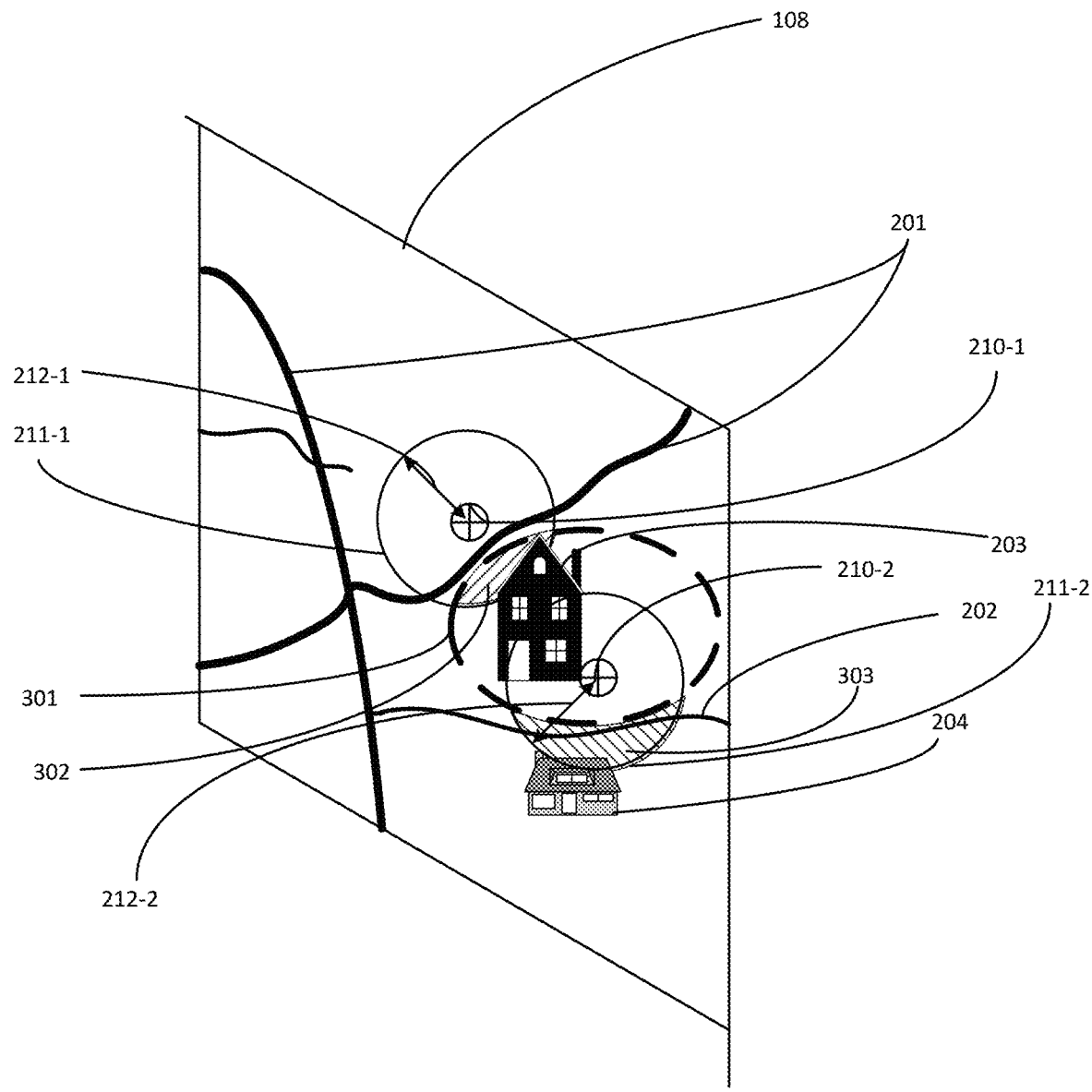
FIG. 3 is a diagram illustrating a display screen displaying a conventional geofence.
Figure 5B:
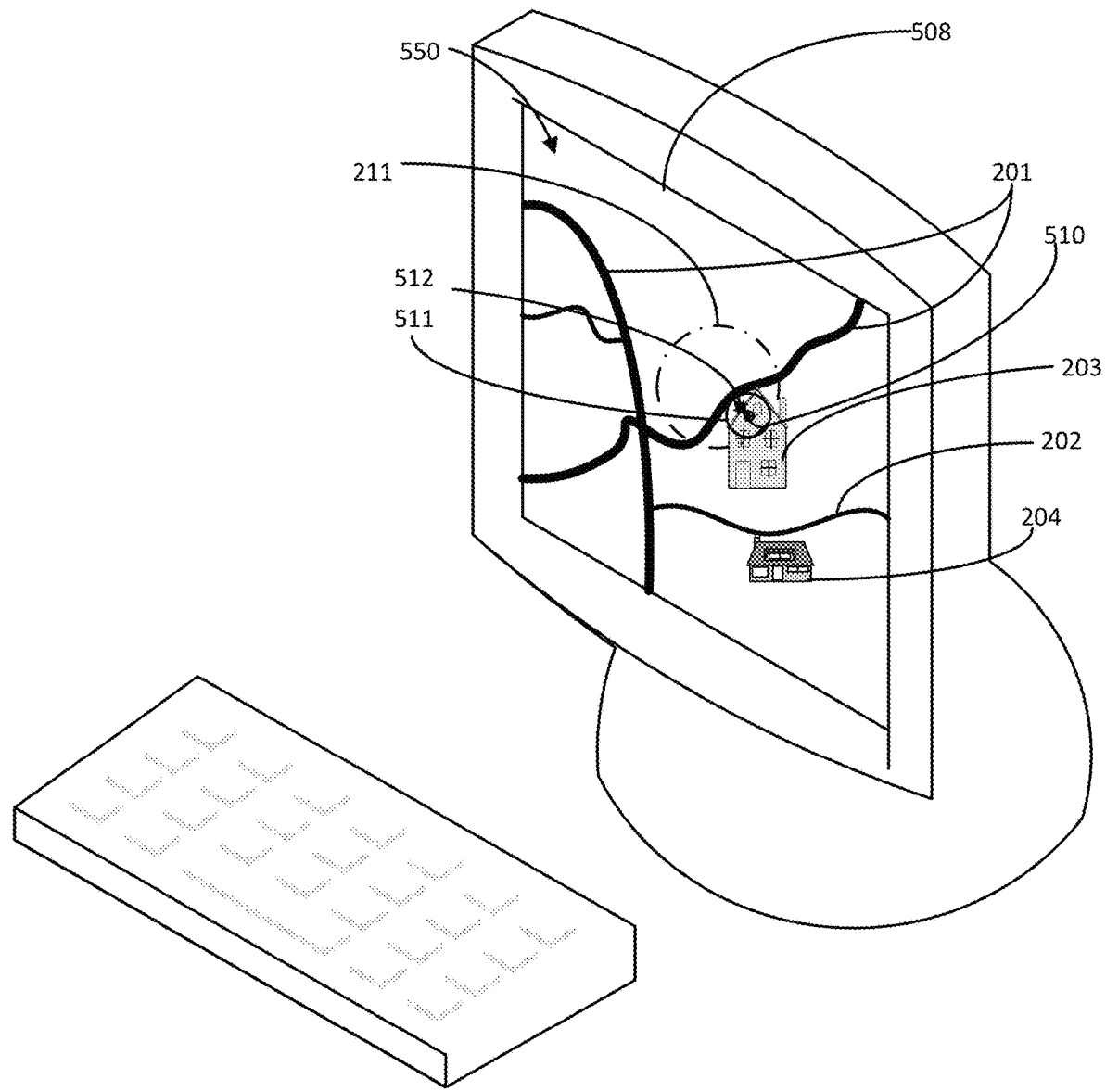
FIG. 5B is a diagram illustrating a display screen displaying a representation of a map using location sensing system 500 according to one embodiment.

FIG. 5B is a diagram illustrating a display screen displaying a representation of a map using location sensing system 500 according to one embodiment. In FIG. 5B, display screen 508 may display a representation of map 550 that is similar to or the same as map 250 of FIG. 2. However, in map 500 the error boundary 211 is significantly reduced to error boundary 511 (defined by smaller radius 512), for example by utilizing the location sensing system 400, thereby improving the accuracy of location 510 of an MCD (e.g., MCD 401). As further shown in FIG. 5B, location 510 may initially be within error boundary 211. However, by utilizing the location sensing system 400, for example, location 510 may be within the much improved error boundary (or sensor accuracy limit) 511.

With continued reference to FIGS. 5A-5B, in one embodiment using the location data and proximity information collected from each of MCDs 501, 501-A1 to 501-A6, and 501-B1 to 501-B6 respectively, server 507 may determine a point of interest (POI) where the respective users of the MCDs 501, 501-A1 to 501-A6, and 501-B1 to 501-B6 are located. In one embodiment, the POI and/or specific areas (or regions) within the POI may be predefined by the users via the MCDs and information of the POI and/or the specific areas (e.g., GPS coordinates and associated descriptions) may be communicated to server 507 to setup and generate a geofence. More specifically, server 507 may utilize the location information and proximity information of the MCDs, and the information of the specific areas to establish a geofence that entirely or partially encompasses (or surrounds) the POI, and/or some or all of the specific areas. In one embodiment, the geofence is created or setup to encompass a POI by a member of a group of registered MCDs, for example MCDs 501, 501-A1 to 501-A6, and 501-B1 to 501-B6 registered with tracking server 507 (as previously described). The geofence may be utilized by server 507 to track and identify individuals or users belonging to the group, for example when the individuals enter or exit the POI (i.e., arrival or departure of an individual at the POI). POI refers to a feature on a map that occupies a particular point (e.g., GPS coordinates and associated descriptions) that a user is interested. The POI, for example, may represent the location of a place for business meetings, a favorite restaurant, a travel destination, a parking lot, a church, a school, a town hall, a distinctive building, etc. Any place of such interest to the individual can be saved as POI and shared with others, for example, as a meeting destination point. Using a geofence to encompass a specific POI provides accurate tracking of the frequency of a user visiting such POI. In one embodiment, the frequency of the user visiting a particular POI may be represented by a heat map and stored in historical data store 502 (e.g., a database) as additional information to fix (or determine) the user's location. A heat map refers to a graphical representation of data where individual values are represented as gradations of color, or patterns that represent the values taken by a variable. In other words, a heat map refers to a data representation where values are represented by color shade gradations. A simple heat map, for example, provides an immediate visual summary of information, thereby allowing easy understanding of complex data patterns.

For example, visiting patterns of family members or members of other user-included groups can be represented in a heat map, where the frequency and recency of a visit to a POI and/or a specific area (or region) within the POI can be represented by a weighted value in the heat map. By giving a greater weight for a visit that is more recent and/or more frequent, for example, the heat map can convey information on the preferences of group members to particular locations and POIs.

Figure 6:
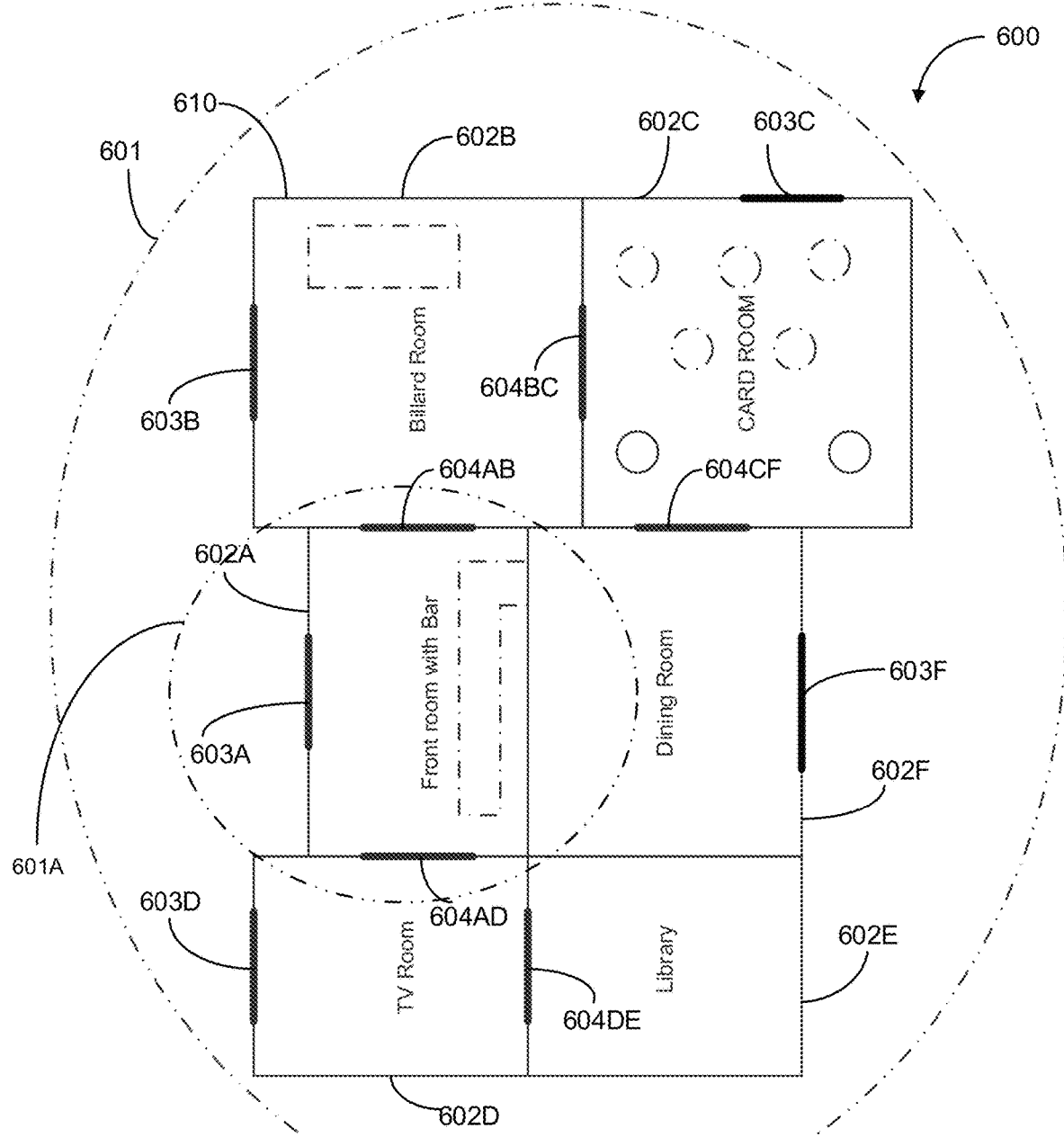
FIG. 6 is a diagram illustrating an exemplary POI with a geofence according to one embodiment.

The user's MCD may be identified to (or registered with) tracking server 507, for example by the user, and tracking server 507 may set up and monitor a geofence and provide intimation (or alerts) to appropriate MCDs, for example MCDs of specified members of the family or group, such as MCDs 501-A1 to 501-A6, when the user crosses the geofence as they enter or exit the POI. An example of such geofence is shown in FIG. 6 discussed herein below. Tracking server 507, based on a set of pre-defined rules and criteria, may optimize the geofence setup by auto-resizing.

Accordingly, it is useful to enable a user to establish geofences that are able to collect data, and trace the behavior of a family or group members, including for example children, and encompassing POIs. It is also useful to be able to establish geofences that can be modified to encompass specific areas within a POI to establish preferred locations and traffic patterns, all of which can be customized and presented to any of the family members or group members on their MCDs. The information presented may include a heat map of the collected data for POIs, and preferred locations within POIs, which will provide information on the congregational preference of the group members.

FIG. 6 is a diagram illustrating an exemplary POI with a geofence according to one embodiment. As shown in FIG. 6, POI 600 may represent the location of clubhouse 610, which is depicted in a layout representation. In one embodiment, clubhouse 610 may include geofence 601A setup and resized to cover some areas or regions (e.g., region 602A, which may be a particular room) of clubhouse 610 for identification of group members entering and leaving clubhouse 610. To automatically resize geofence 601A, a number of different factors may be considered. One factor may be historical patterns of a specific user visiting a given location. For example, a default border (or boundary) of geofence 601A may be set to be a rectangle with specific length and width, or a circle with a perimeter defined by a specific radius. If it is determined that a user has preferred regions 602A-602F (e.g., rooms frequented within clubhouse 610) within POI 600 (i.e., clubhouse 610 in this example), and if regions 602A-602F are connected to the same network (e.g., network 506 of FIG. 5A) and the size of geofence 601A is too small, then the size of the geofence 601A may be automatically expanded (e.g., by server 507 of FIG. 5A) to geofence 601 to encompass regions 602A-602F. In other words, if a heat map is generated (and stored in data store 502 in one embodiment) to represent locations of the user's preferred regions (i.e., the rooms frequently visited by the user or recently visited by the user) for POI 600, the border of the geofence can be automatically adjusted to mirror that heat map. In one embodiment, regions 602A-602F included in clubhouse 610 may be predefined by one or more group members, for example, via an application (also referred to as "app") installed on their MCDs (e.g., MCDs 501, 501-A1 to 501-A6, 501-B1 to 501-B6). Information of regions 602A-602F may then be communicated to server 507 to establish a geofence (e.g., geofence 601 or 601A).

Figure 7:
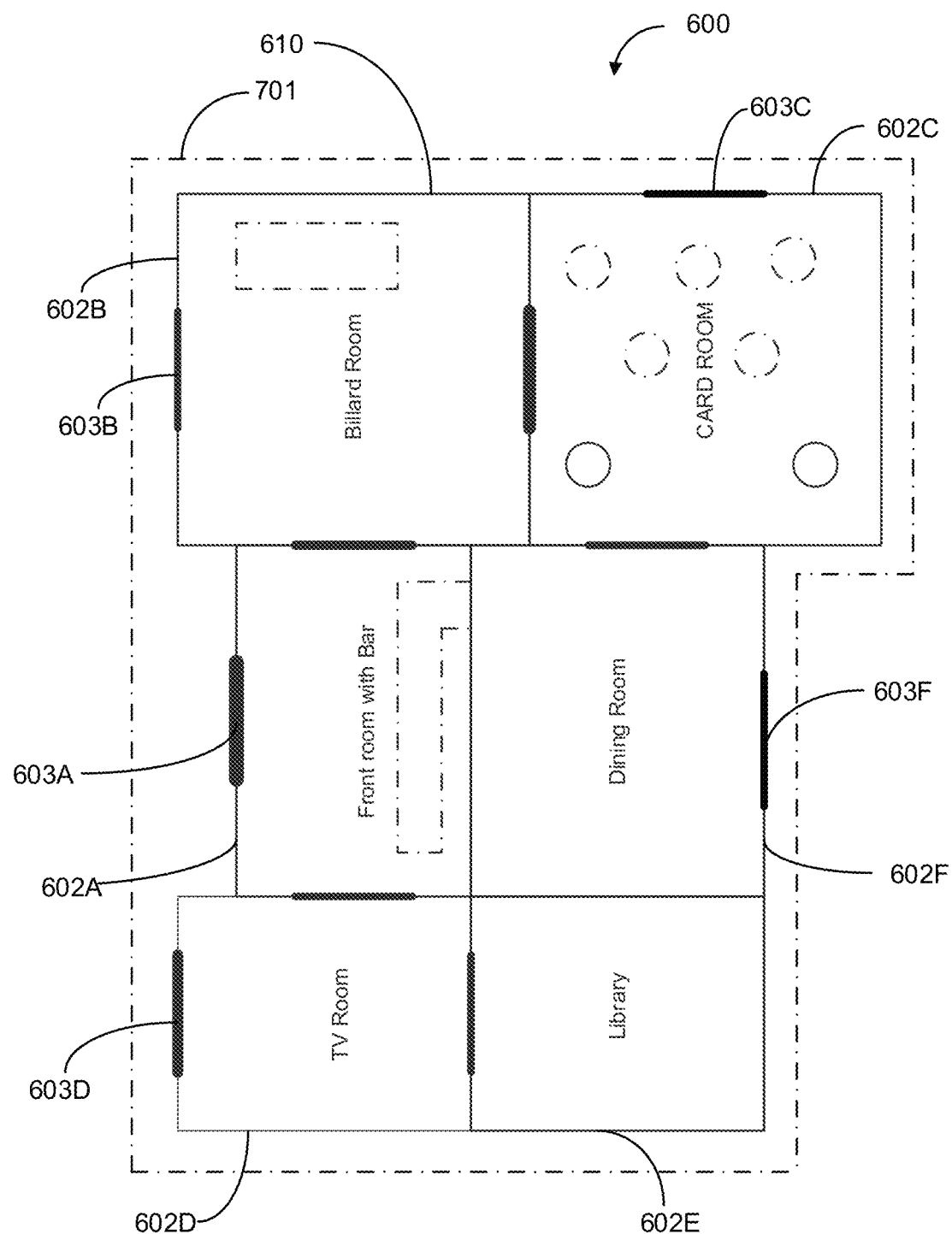
FIG. 7 is a diagram illustrating the exemplary POI with another geofence according to one embodiment.

FIG. 7 is a diagram illustrating the exemplary POI with another geofence according to one embodiment. Similar to FIG. 6, FIG. 7 shows different regions within clubhouse 610. In FIG. 7, a resized geofence 701 encompassing regions 602A-602F of clubhouse 610 is shown. In one embodiment, geofence 701 has a shape that accurately reflects the real-world behavior of tracked individuals (e.g., a shape that closely adheres or resembles to the layout representation of clubhouse 610), and effectively avoids false positive and/or false negative alerts. In establishing geofence 701, historical behavior, accuracy of the location sample, the function of visiting frequency, dwell time, and/or visiting recency of the group members (e.g., the users of MCDs 501, 501-A1 to 501-A6 and/or 501-B1 to 501-B6) may be utilized to generate a heat map in order to determine the effectiveness of geofence 701. As previously described, in one embodiment the heat map may be stored in data store 502, although in another embodiment, the heat map may be stored on a persistent storage device of server 507.

For example, some members of the group of members may interact at a single place (e.g., any of regions 602A-602F) in different ways (e.g., via access point 603A, 603B, 603C, or 603D, which may be a door to a particular room in one embodiment). In one embodiment, the geofence may be of circular or oval shaped (as indicated by geofence 601 in FIG. 6). In another embodiment, the geofence may reflect the layout of clubhouse 610, as indicated by geofence 701 in FIG. 7. In one embodiment, the border of the geofence (e.g., geofence 701) may not simply be of a binary condition (i.e., not limited to inside or outside of the geofence). Different portions of the border or boundary of the geofence (e.g., geofence 701) may have weights (e.g., weighted values) based on historical visiting patterns that may be used to determine a likelihood that a given sample of user(s) or member(s) will cross certain parts of the boundary of the geofence, as shown by the thickness of access points 603A-603F.

In some embodiments, user inputs may be used to adjust a geofence. For example, if a user manually tags a location with POI information, for example via an app installed on the user's MCD, the tag may be used as input to adjust the size and shape of the geofence. For example, if a user tags a first current location as clubhouse 610, and subsequently tags a second current location as clubhouse 610. However, if the first tagged location is different than the second tagged location, then the size of the geofence encompassing clubhouse 610 may be adjusted to encompass both of the first and second tagged locations. This scenario, for example, is illustrated in FIG. 6, where the first tagged location may correspond to region 602A (labelled "Front room with Bar"), and the second tagged location may correspond to region 602F (labelled "Dining Room") located at the back of clubhouse 610. In some embodiments, if all regions 602A-602F in clubhouse 610 are being accessed by the group members, the geofence may encompass the entire clubhouse 610, as illustrated in FIG. 7.

In some embodiments, accessing patterns of a group of members or users may be used to adjust a geofence. For example, if all members of a family (with different communication devices) interact differently around their home (e.g., mother tends to be west of the centroid and father tends to be south of the centroid), then the size and shape of the home's geofence may be adjusted to best fit the habits of all members of that family. This for example may enable better accommodation of different phone usage patterns and different device types.

In some embodiments, quality of location data may be taken into account when adjusting a geofence. As previously discussed, the quality of location data collected may be found to be inaccurate (e.g., due to sensors inaccuracies and/or reflections from surroundings). Therefore, the current size of a geofence may be increased to reflect that uncertainty and avoid signal bounce. Conversely, if the collected data available are found to be very accurate, the geofence may be decreased or made smaller, so that it can be more responsive and useful.

In some embodiments, automatic prediction of POI information for POI 600 may be used to adjust a geofence. In general, being able to predict which specific POI (e.g., POI 600) a user is located at without input is difficult. Therefore, having a geofence with a boundary that automatically evolves or adjusts over time based on historical visiting patterns and the quality of the location samples may produce improved POI labeling (e.g., POI labeling for specific regions within clubhouse 610, such as regions 602A-602F).

Accordingly, as the geofence's boundary may automatically evolve over time, false positive or false negative alerts may be reduced or eliminated, thereby generating reliable geofence triggered alerts as opposed to a user-defined geofence. In other words, having an adaptive and accurate geofence may decrease the number of false positive or false negative alerts, and therefore, building more trust from users. In various embodiments, the size and shape of a geofence may be adjusted as experience and data on geofence crossings, and heat maps are accumulated for the group members, as a whole or optionally for each family or individual group member.

Still referring to FIG. 7, an auto adjustment in the size of geofence 701 to encompass multiple tagged locations, for example, some or all of regions 602A-602F of clubhouse 610, which form POI 600. Initially, geofence 701 may be set up to encompass clubhouse 610 with access points 603A-603F using, for example, oval geofence 601 of FIG. 6. Subsequently, it may be determined that the user has different preferred locations he/she frequents or visits in POI 600. That is, within geofence 601, the user may frequent some of the regions 602A-602F within the clubhouse 610.

In some embodiments, regions 602A-602F may be connected to the same wireless network (e.g., network 506) having the same service set identifier (SSID). The individual or member generally occupies a region every time he/she is at such location. This information may be transmitted from the individual's MCD (e.g., MCD 501) to a tracking server (e.g., server 507) over the wireless network. Therefore, the size of geofence 601 may be automatically adjusted or resized, for example by the tracking server, to encompass all the regions in which the member visits and occupies at POI 600 (i.e., clubhouse 610 in this particular example). This is illustrated in FIG. 7 as geofence 701 covering the clubhouse 610 including external access points 603A, 603B, 603D and 603F.

Figure 8:
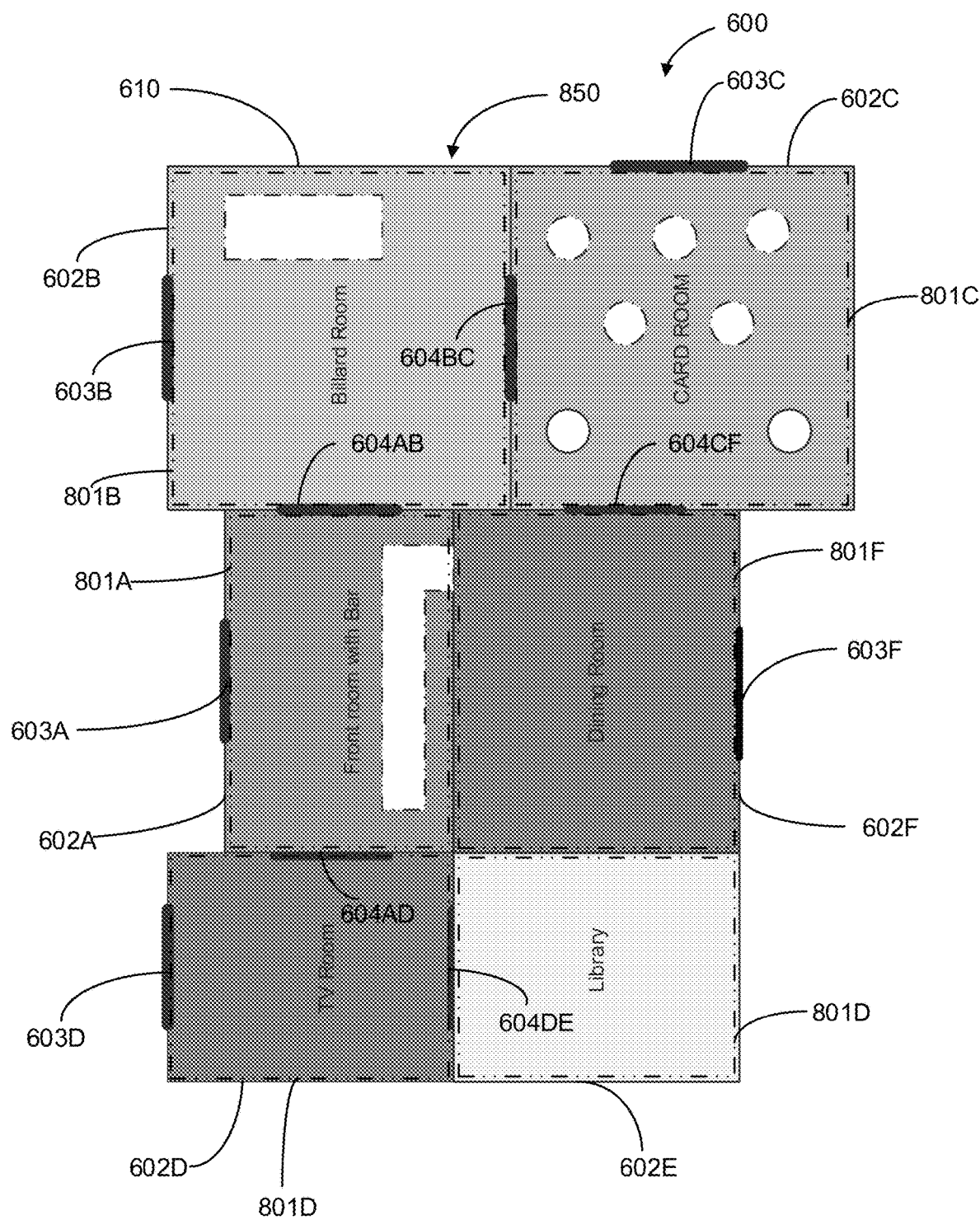
FIG. 8 is a diagram illustrating the exemplary POI having a number of geofences setup based on a heat map according to one embodiment.

FIG. 8 is a diagram illustrating the exemplary POI having a number of geofences setup based on a heat map according to one embodiment. Referring to FIG. 8 geofences 801A-801F respectively covering regions 602A-602F are shown. Each region may be accessed via internal access points 604AB, 604BC, 604CF, 604AD and 604DE from another access point, or through external access points 603A-603D and 603F. In one embodiment, geofences 801A-801F allow tracking of the group or each individual member of the group as they access each region. That is, geofences 801A-801F may be generated, for example by a tracking server such as server 507, to cover activities of individual members within the group within regions 602A-602F based on information of region 602A-602F, which may be previously communicated to the tracking server from the members' MCDs. Geofences 801A-801F therefore provide recognition of the presence of each individual member in the clubhouse 610 and enable making provisions to provide specific services to the member within the group.

In one embodiment, a heat map 850 for the group or each individual member of the group may be generated, for example by server 507, to represent activity information of the group or each member of the group as they access regions 602A-602F. In one embodiment, the activity information may be communicated to (e.g., from each member's MCD) or collected by tracking server 507. For example, regions 602A-602F covered by respective geofences 801A-801F are represented by different shades of gray (or weighted values) that indicate functions of visiting recency and/or time spent within each geofence (i.e., dwell time) by members of the tracked group. Furthermore, the frequency of crossing of each geofence boundary, either entrance or exit, from any of the access points (e.g., internal access points 604AB, 604BC, 604CF, 604AD and 604DE, and/or external access points 603A-603D and 603F) can be represented by line weight (or thickness) of, for example, access points 603A-603D and 603F. As an example, referring to FIG. 8, regions 602A-602F and/or access points 603A-603F, 604AB, 604BC, 604CF, 604AD and 604DE may be predefined and labelled by one or more group members, for example via an app installed on their MCDs. The user-defined region information and access point information may then be communicate to a tracking server (e.g., server 507), where the information may be stored in data store 502. Based at least on the user-defined region information, location information and/or proximity information of the group member(s), the tracking server may setup and establish geofences 801A-801F that respectively encompass regions 602A-602F to track the activities of the group or each member in the group for each region.

Turning now to region 602D (which is labelled "TV Room"), which may be accessed through access points 603D, 604AD, and 604DE, as an example. In region 602D, access point 603D has the highest weighted value (i.e., highest thickness) as compared to access points 604AD and 604DE. This, for example, indicates that the group or each member of the group accesses or visits region 602D through access point 603D more frequency and/or more recently as opposed to access points 604AD and 604DE. In one embodiment, the visiting frequency and visiting recency of region 602D through access points 603D, 604AD, 604DE may be determined and generated by the tracking server based on location information and/or proximity information of the group members (e.g., location and proximity information of each of MCDs 501, 501-A1 to 501-A6, 501-B1 to 501-B6). In another embodiment, the visiting frequency and visiting recency of region 602D may instead be determined or calculated by each of MCDs 501, 501-A1 to 501-A6, 501-B1 to 501-B6, where each of the MCDS 501, 501-A1 to 501-A6, 501-B1 to 501-B6 communicates its respective visiting frequency and visiting recency information to the tracking server.

In some embodiments, by continuously monitoring the location information and proximity information of the MCDs, the tracking server may capture and record a current time (e.g., generating a timestamp) each time a group member enters or exits via access points 603D, 604AD, 604DE. That is, a timestamp of a current time is recorded each time a group member crosses geofence 801D. Based on the recorded timestamps, the tracking server may determine (or compute) the visiting frequency and visiting recency of each group member or the group that visits region 602D.

In one embodiment, using the visiting frequency and/or visiting recency information, the tracking server may determine a shade for region 602D in heat map 850. That is, if region 602D is more frequently and/or recently visited as compared to regions 602A-602C, 602E-602F, region 602D may be represented by a darker shade in heat map 850. On the other hand, if region 602D is less frequently and/or recently visited, region 602D may be represented by a lighter shade. It should be appreciated that while a darker shade may represent a more frequently or recently visited region and a lighter shade may represent a less frequently or recently visited region, in one embodiment, the opposite may be true. That is, a lighter shade may represent a more frequently or recently visited region while a darker shade may represent a less frequently or recently visited region. In one embodiment, an aggregate of weighted values associated with access points 603D, 604AD and 604DE may determine the shade of region 602D. For example, in FIG. 8, an aggregate weight value of access points 603D, 604AD and 604DE of region 602D is greater than an aggregate weight value of access points 603B and 604BC of region 602B. This, therefore, indicates that region 602D is more frequently and/or recently visited as compared to region 602B, as represented by a darker shade in region 602D as opposed to a lighter shade in region 602B.

In one embodiment, dwell time of a group member (or the group collectively) within a specific region may also be used to determine the different shades in heat map 850. For example, based on the recorded timestamps, the tracking server may determine the entrance time and exit time of each group member who visits region 602D. By knowing the entrance time and exit time, in one embodiment the tracking server may compute the dwell time (e.g., delta of exit time and entrance time) for each group member who visits or accesses region 602D. In another embodiment, the dwell time may be computed by each member's MCD and subsequently communicated to the tracking server. According, a higher dwell time, for example, may correspond to a darker shade in region 602D, while a lower dwell time may correspond to a lighter shade in region 602D. Accordingly, in the example in FIG. 8, the dwell time in region 602D may be higher than the dwell time in region 602B for a group member or the group.

In one embodiment, the visiting frequency, visiting recency and/or dwell time of each group member may be utilized to train machine learning models/algorithms (e.g., deep learning architectures such as deep neural networks, convolutional neural networks, deep belief networks and/or recurrent neural networks) to recognize the activities of the group members within POI 600.

It should be appreciated that the foregoing descriptions with respect to region 602D and associated access points 603D, 604AD, 604DE are merely one example. Such descriptions with respect to region 602D are similarly applicable to region 602A (with associated access points 603A, 604AD, 604AB), region 602B (with associated access points 603B, 604AB, 604BC), region 602C (with associated access points 603C, 604BC, 604CF), region 602E (with associated access point 604DE), and region 602F (with associated access points 603F, 604CF). Therefore, for brevity sake, operations of regions 602A-602C, 602E-602F will not be described in details with respect to heat map 850.

Figure 9:
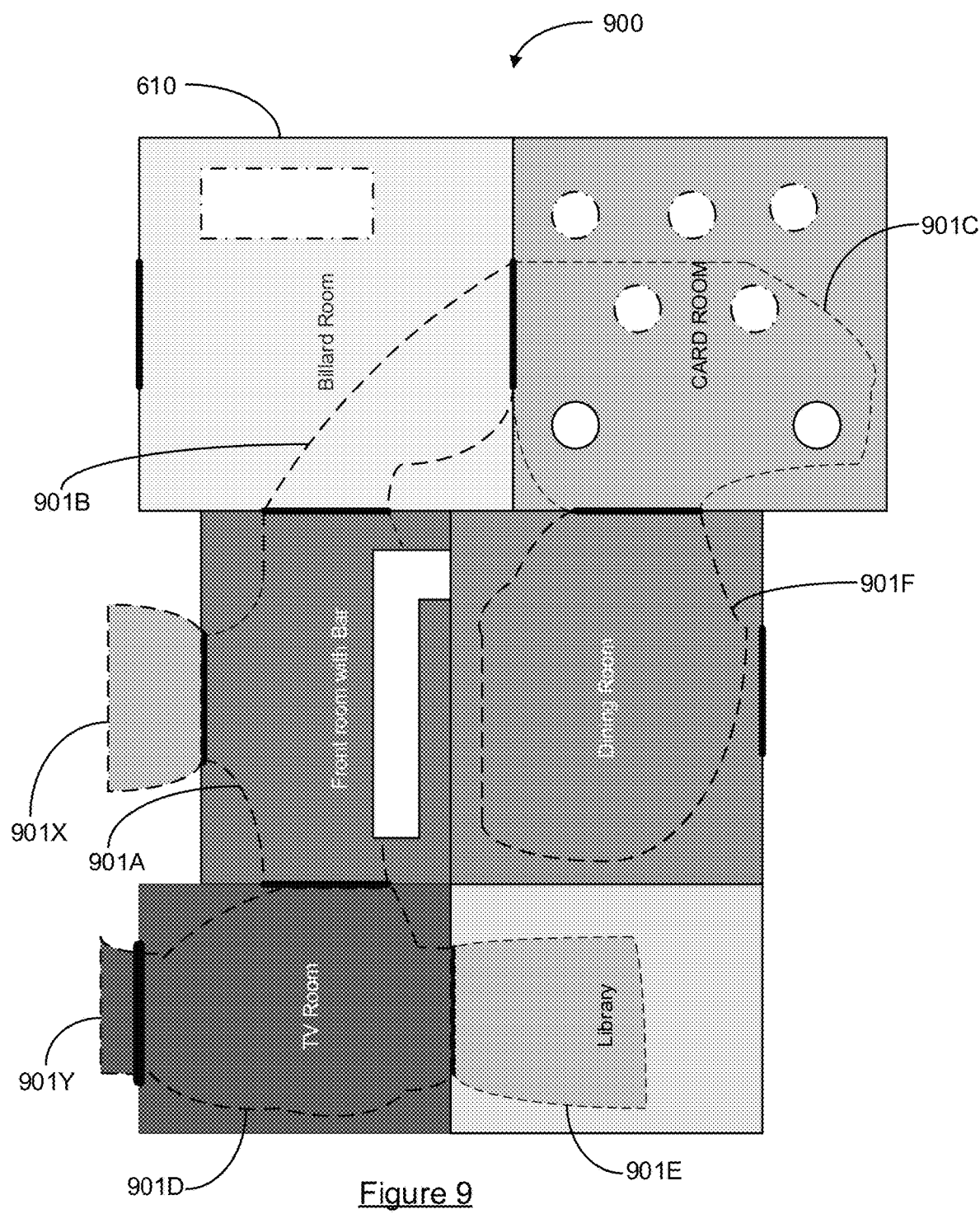
FIG. 9 is a diagram illustrating an exemplary POI represented by a number of heat maps according to one embodiment.

FIG. 9 is a diagram illustrating an exemplary POI represented by a number of heat maps according to one embodiment. In FIG. 9, POI 900 may represent the location of clubhouse 610. As further shown in FIG. 9, a number of heat maps 901A-901F may respectively represent a function of visiting recency, dwell time, and/or visiting frequency for a number of sub-regions within the regions of clubhouse 610, as shown in gradations or shades of gray similar to that previously discussed with respect to FIG. 8. Based on heat maps 901A-901F, a geofence may be resized to encompass the sub-regions (as represented by heat maps 901A-901F) within the regions of POI 900 to track accessing activities (e.g., arrival and departure) of an individual member of the group of members (or the entire group) within the sub-regions. In one embodiment, the sub-regions may reflect the areas covered by heat maps 901A-901F. In one embodiment, heat maps 901A-901F may be expanded to include preferred entry and exit locations 901X and 901Y of the individual member (e.g., entry and exit locations that are frequently or recently used by the member or the group collectively).

Figure 10:
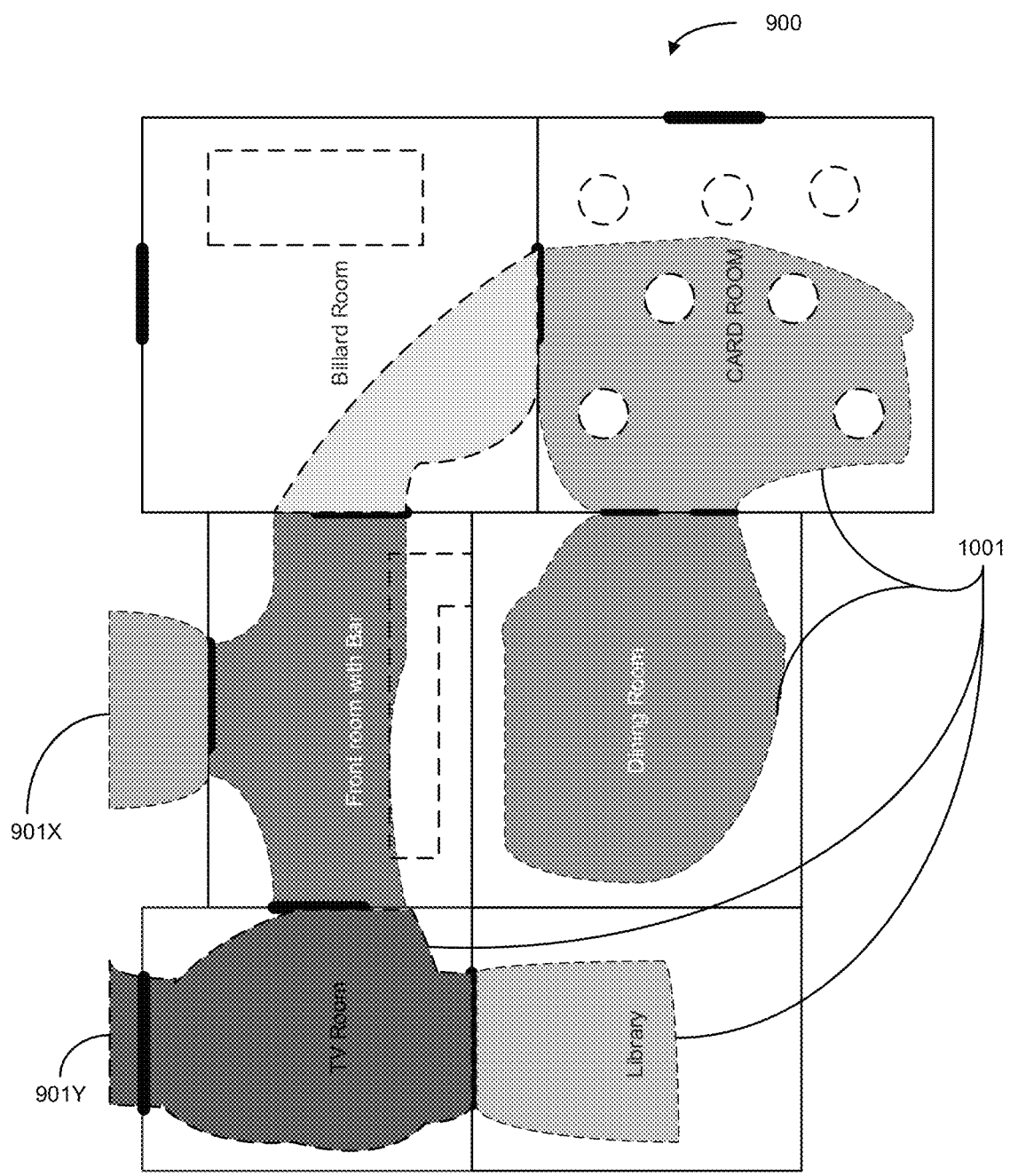
FIG. 10 is a diagram illustrating the exemplary POI having another geofence setup based on the number of heat maps according to one embodiment.

FIG. 10 is a diagram illustrating the exemplary POI having another geofence setup based on the number of heat maps according to one embodiment. With reference to FIG. 10, in one embodiment, geofence 1001 may be resized, adjusted, or otherwise cropped to encompass sub-regions represented by heat maps 901A-901F (as previously discussed with respect to FIG. 9) in order to track the activities (or changes in the activities, such as geofence crossing) of an individual member of the group of members (or the entire group) within clubhouse 610. The adjustment of geofence 1001 may be based on one or more of heat maps 901A-901F, which may represent a function of visiting frequency and visiting recency of the individual member at a particular sub-region within a region of clubhouse 610.

As an example, if an individual member (e.g., a high net worth individual) frequently accesses a larger area, such as a stadium, geofence 1001 may automatically expand to cover the member's frequently accessed area, which may include for example preferred entry points and seating locations in the stadium. This way, alerts or notifications to customer service of personal arrival of the member in the stadium may be provided. Such applications therefore may enhance the quality of customer service provided to such individual member.

Figure 11:
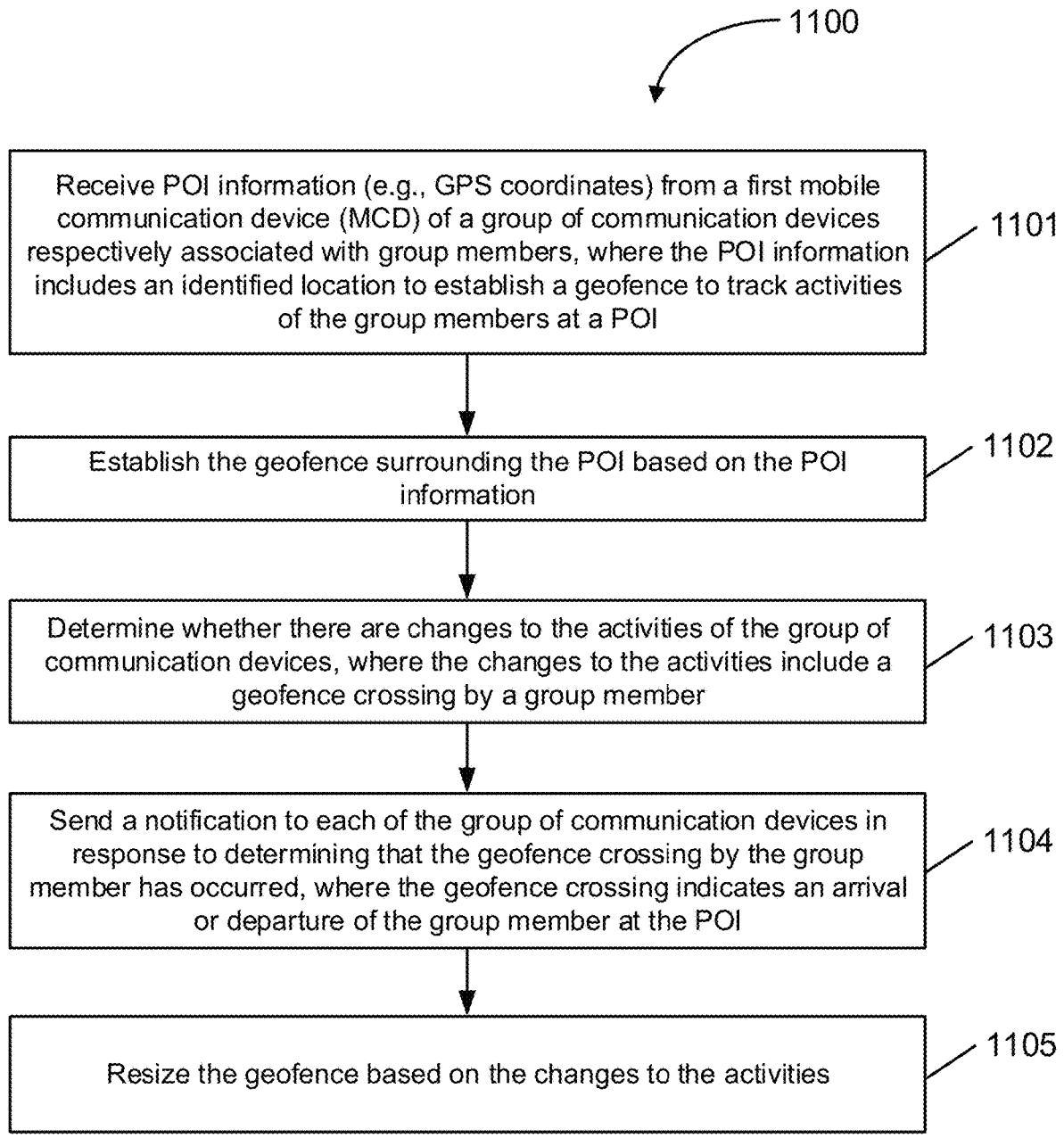
FIG. 11 is a flow diagram of a method of automatically resizing a geofence surrounding a POI according to one embodiment.

FIG. 11 is a flow diagram of a method of automatically resizing a geofence surrounding a POI according to one embodiment. Process 1100 may be performed by processing logic which may include software, hardware, or a combination thereof. For example, process 1100 may be performed by server 507 of FIG. 5A.

Referring to FIG. 11, at block 1101, the processing logic receives POI information (e.g., GPS coordinates) from a first mobile communication device (MCD) of a group of communication devices respectively associated with group members, where the POI information includes an identified location to establish a geofence to track activities of the group members at a POI. In one embodiment, the MCD intimates the tracking server to establish the geofence around the identified POI to track the arrival, departure, and other activities of the group of communication devices. At block 1102, the processing logic establishes the geofence surrounding the POI based on the POI information. For example, the tracking server may establish the geofence surrounding the POI based on the details provided by the first MCD and/or any pre-fixed rules for the geofence, including information of the individual member or the group of members that is to be sent when each member is identified as crossing the geofence to enter or exit the POI. At block 1103, the processing logic determines whether there are changes to the activities of the group of communication devices, where the changes to the activities include a geofence crossing by a group member. For example, the tracking server may continuously monitor the geofence boundaries and the locations of the groups of communication devices to identify their crossing of the geofence. At block 1104, the processing logic sends a notification to each of the group of communication devices in response to determining that the geofence crossing by the group member has occurred, where the geofence crossing indicates an arrival or departure of the group member at the POI. For example, the tracking server may send a notification to each of the group of communication devices, which may be identified or configured to receive notifications of any geofence crossing by the group members arriving or departing the POI during setup of the geofence. At block 1105, the processing logic resizes the geofence based on the changes to the activities. In some embodiments, the tracking server may be enabled, if so desired by a user, to continuously monitor the activity of group members when they are within the geofence at the POI, to establish a heat map of activity as a function of frequency, recency, and dwell times, and to enable auto-resizing of the geofence in order to provide more accurate notifications and responses to the crossing of the geofence by group members.

Figure 12:
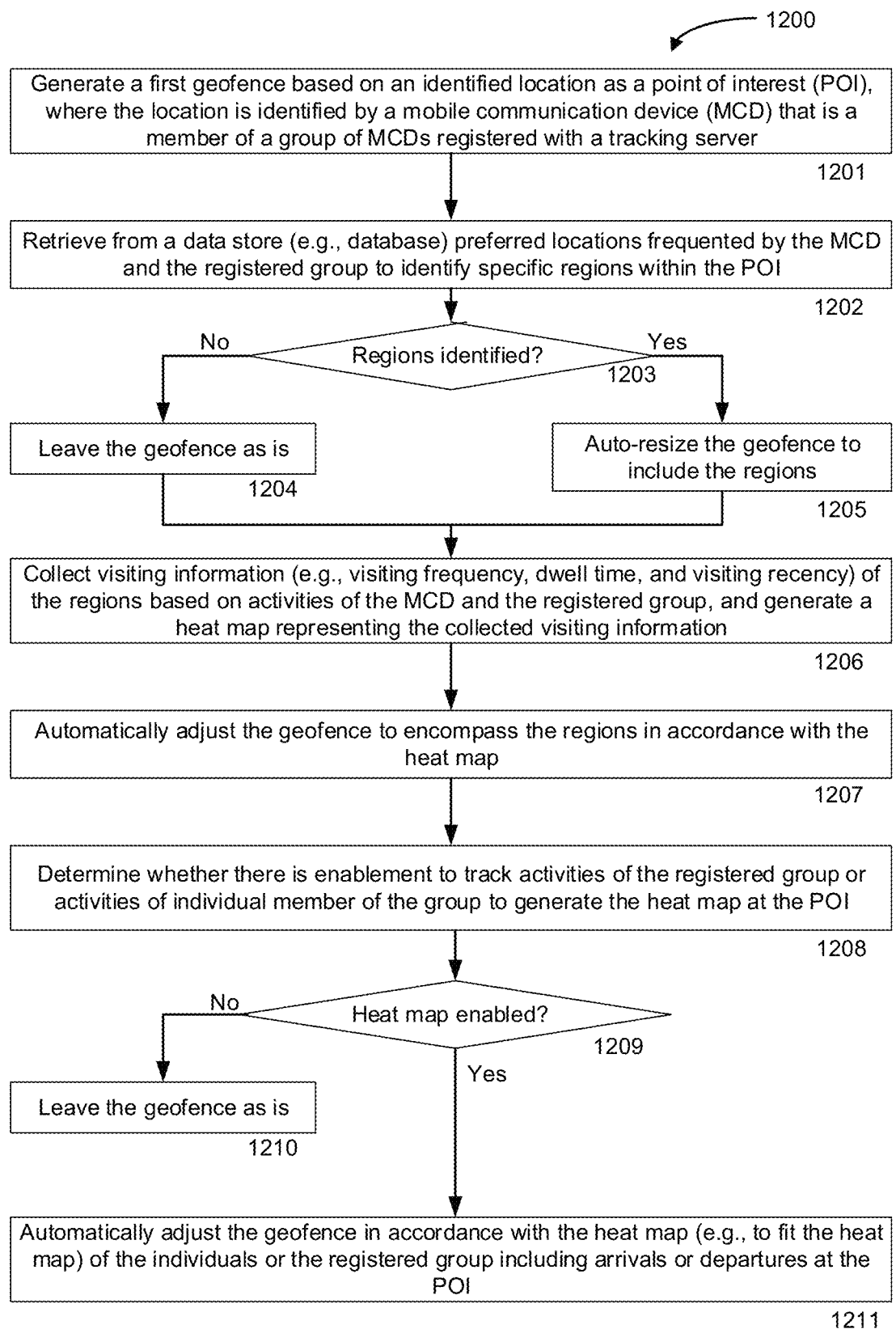
FIG. 12 is a flow diagram of another method of automatically resizing a geofence surround a POI according to one embodiment.

FIG. 12 is a flow diagram of another method of automatically resizing a geofence surround a POI according to one embodiment. Process 1200 may be performed by processing logic which may include software, hardware, or a combination thereof. For example, process 1200 may be performed by server 507 of FIG. 5A.

Referring to FIG. 12, at block 1201, the processing logic generates a geofence based on an identified location as a point of interest (POI), where the location is identified by a mobile communication device (MCD) that is a member of a group of MCDs registered with a tracking server. In some embodiments, the default border of geofence 601A in FIG. 6 around the POI identified by an MCD and established by a coordinated effort between MCD and the tracking server may be a circle, or an oval as shown in FIG. 6 that is generally reflective of the user's initial input at the POI, and any pre-established rules. The initial geofence is established with a reasonable coverage of the specified dwell and entrances to the dwell.

At block 1202, the processing logic retrieves from a data store (e.g., database) preferred locations frequented by the MCD and the registered group to identify specific regions within the POI. For example, the tracking server may check the stored location and activity in a database to identify additional preferred frequented locations or specific areas of the user and his/her group members at the POI. The specific areas may be considered to be part of the POI if they share, for example, the same SSID in a network.

At block 1203, the processing logic determines whether the regions are identified. If so, the processing logic proceeds to block 1205, where the processing logic auto-resizes the geofence to include the regions. For example, if multiple regions at the POI are identified, in one embodiment the size of the geofence may be adjusted to encompass the preferred locations and the regions by expanding the original geofence 601A to the geofence 601 to cover the identified regions. Otherwise, the processing logic proceeds to block 1204, where the geofence is left unchanged. At block 1206, the processing logic collects visiting information (e.g., visiting frequency, dwell time, and visiting recency) of the regions based on activities of the MCD and the registered group, and generate a heat map representing the collected visiting information. For example, based on activity information collected and stored in the database as a function of how often the identified regions are frequented, what are the dwell times at the locations of the regions, how recently has the region been frequented by the user or the registered and tracked members of the user's group, a heat map for each of the regions at the given preferred location or POI is established.

At block 1207, the processing logic automatically adjusts the geofence to encompass the regions in accordance with the heat map. For example, in one embodiment the size of the geofence may auto-resized or adjusted to cover the regions if a predefined crossing threshold is exceeded. More specifically, it may not be desirable or effective to adjust the geofence due to a random one-time movement of a group member. For example if there are hundreds of activities defining the geofence in region 602D of FIGS. 9 and 10 (labelled as "TV Room"), it may not be effective to redefine the heat map 901D of FIG. 9, and therefore adjust geofence 1001 of FIG. 10, based on, for example, a few random movements of the group members in a corner of region 602D outside the geofence. This is an aberration which may not be repeated. Therefore, in one embodiment, a number of geofence crossings (e.g., arrivals and/or departures) by the group member or the group of members may be required to meet (or exceed) the predefined crossing threshold prior to redefining the current heat map (e.g., heat map 901D), thereby adjusting or resizing the geofence (e.g., geofence 1001), by re-determining the visiting frequency, visiting recency, and/or dwell time, which as previously described is represented by the heat map.

However, in another embodiment, adjustment of the geofence based on a few movements of the group members or the group may be performed. For instance, if such movements are repeated to reach or exceed a threshold percentage when compared to the current geofence, then the geofence may be adjusted based on the movements. As an example, referring to region 602E of FIGS. 9 & 10 (which is labelled "Library"), region 602E has a low number of activities as compared to region 602D since it is represented by a lighter shade in heat map 901E of FIG. 9. Accordingly, a few movements associated with region 602E (e.g., entrance or exit of region 602E) may be sufficient to adjust the geofence as long as the number of such movements is repeated to reach or exceed a threshold percentage as compared to the current geofence. This therefore ensures the reliability of the movements (e.g., the movements are not a one-time random incident).

At block 1208, the processing logic determines whether there is enablement to track activities of the registered group or activities of individual member of the group to generate the heat map at the POI. For example, in one embodiment the tracking server may check for any enablement of location specific heat map of activity, as a function of recency, dwell time and frequency for the registered group (or individual members of the registered group) at the POI.

At block 1209, the processing logic determines whether the heat map is enabled. If so, the processing logic proceeds to block 1211, where the processing logic automatically adjusts the geofence in accordance with the heat map (e.g., to fit the heat map) of the individuals or the registered group including arrivals or departures at the POI. For instance, if there is a heat map, in one embodiment the border of the geofence may be auto-adjusted to mirror that heat map within the regions and cover the access points of the regions. This adjusted geofence that is reflecting the heat map of the activity now, for example, has a shape and shade that much more accurately reflects the behavior of the user or group of users. The adjusted geofence with the much smaller error boundary also enables avoiding false positives or false negatives more effectively. Otherwise, the processing logic proceeds to block 1210, where the geofence is left unchanged.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 13:
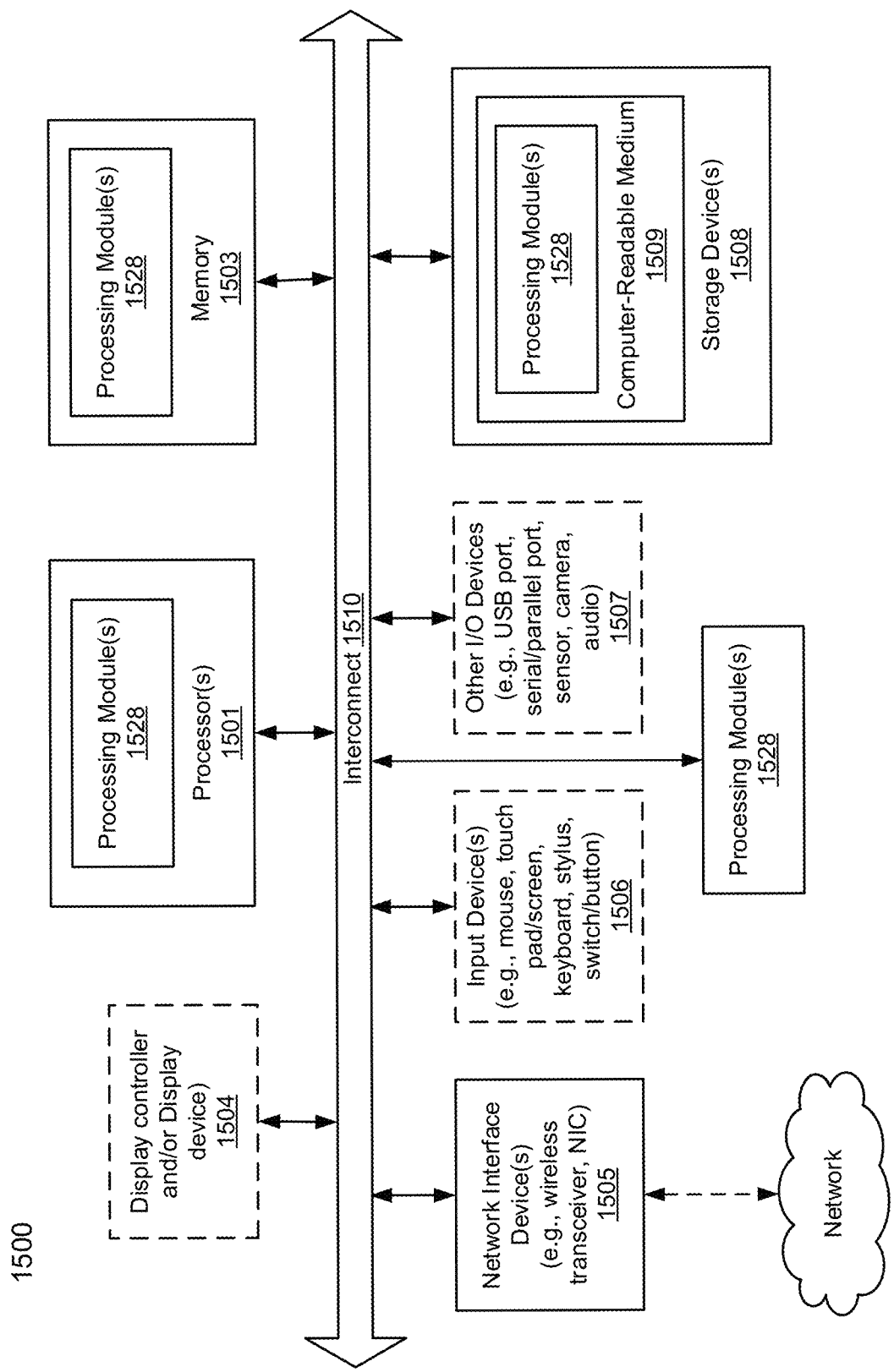
FIG. 13 is a block diagram illustrating an example of a data processing system which may be used with one embodiment of the disclosure.

FIG. 13 is a block diagram illustrating an example of a data processing system which may be used with one embodiment of the disclosure. For example, system 1500 may represent any of data processing systems described above performing any of the processes or methods described above, such as, for example, server 507 or any of the MCDs in FIG. 5A. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, components performed by a tracking server or an MCD. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A system for resizing a geofence surrounding a point of interest (POI) based on activities of members of a group, at the POI, each group member having an associated and trackable mobile communication device (MCD), the system comprising;
a server configured to:
register MCDs associated with members of a registered group and form a registered and trackable group;
receive POI information from a first MCD of the associated registered mobile communication devices respectively associated with the members of the group, wherein the POI information includes an identified location to establish one or more geofences at the POI to track the activities of the members of the registered group at the POI;
establish the one or more geofences surrounding the POI based on the POI information;
receive activity information from the registered MCDs;
identify specific regions at the POI based on historical visiting patterns of the members of the registered group visiting the specific regions;
determine changes in activity of the members of the registered group at the POI based on the activity information, wherein the changes in activity include a geofence crossing by one or more of the members of the registered group;
send a notification to an assigned MCD of a member, or to each of the associated MCDs of all group members in response to the geofence crossing by the one or more of the members of the registered group, wherein the geofence crossing indicates an arrival or departure of any of the members of the registered group at the POI; and
automatically re-size the one or more geofences to encompass the identified specific regions at the POI based on the determined changes in activity.

2. The system of claim 1, wherein the historical visiting patterns comprise any or all of a visiting frequency, a visiting recency, or a dwell time of the MCDs associated with the members of the registered group visiting the specific regions.

3. The system of claim 1, wherein the historical visiting patterns comprise a visiting frequency, a visiting recency, or a dwell time of the MCDs associated with the members of the registered group visiting the specific regions, and are represented in a data representation.

4. The system of claim 3, wherein the server is configured to re-size the one or more geofences automatically in accordance with the data representation.

5. The system of claim 1, wherein to establish the one or more geofences surrounding the POI, the server is configured to use the activity information from each of the registered MCDs associated with the members of the registered group.

6. The system of claim 5, wherein server is further configured to determine specific regions within the POI, and generate a heat map of the specific regions within the POI based on the activity information and historical visiting patterns.

7. The system of claim 6, wherein the heat map represents a frequency of visit of members associated with the specific regions within the POI.

8. The system of claim 7, wherein the heat map is a representation of data of the frequency of visit of the members associated with the specific regions, where data values of the representation of data are represented as gradations of color, or patterns that represent the data values taken by a variable to provide an immediate visual summary of information, thereby allowing an easy understanding of complex historical visiting data patterns.

9. The system of claim 6, wherein the server is further configured to assign a greater weighted value in the heat map to a specific region that is more frequently and recently visited when generating the heat map of the specific regions within the POI.

10. The system of claim 9, wherein the server is further configured to use weighted values in the heat map to automatically re-size the one or more geofences.

11. A method of re-sizing a geofence surrounding a point of interest (POI), comprising:
receiving, by a server, POI information from a first mobile communication device (MCD) of MCDs respectively associated with members of a group at the POI, the POI information including an identified location to establish a geofence surrounding the POI in order to track activities of the members of the group at the POI;
establishing, by the server, the geofence surrounding the POI based on the POI information;
determining, by the server, specific regions within the POI based on historical activity patterns of the members of the group visiting the specific regions;
tracking, by the server, the activities of the members of the group at the specific regions to generate a heat map representing the activities of the members; and
re-sizing, by the server, the geofence to encompass the specific regions at the POI based on the heat maps;
wherein the activities of the members of the group at the specific regions are weighted based on a visiting recency and a visiting frequency;
wherein the weighted activity of the members of the group at the specific regions are represented by the heat map.

12. The method of claim 11, wherein the activities of the members of the group at the specific regions comprise a crossing of the geofence or a movement by one or more members of the group.

13. A method of adjusting a geofence surrounding a point of interest (POI) to track activities of members of a group at the POI, the method comprising:
receiving, by a server, POI information from a first mobile communication device (MCD) associated with a first member of the group at the POI;
establishing, by the server, a geofence surrounding the POI based on the POI information;
identifying, by the server, at least one specific region at the POI based on historical visiting patterns of the members of the group visiting the at least one specific region;
determining, by the server, changes in activity of the members of the group at the POI; and
automatically re-sizing, by the server, the geofence to encompass the identified at least one specific region at the POI based on the determined changes in activity.

14. The method of claim 13, further comprising: sending, by the server, a notification to a second MCD associated with a second member of the group in response to determining the changes in activity, wherein the changes in activity include a geofence crossing by one or more members of the group.

15. The method of claim 13, wherein the POI information includes a location to establish the geofence to track activities of the members of the group at the POI.

16. The method of claim 13, further comprising:
   tracking activities of the members at the at least one specific region.

\* \* \* \* \*